Nov. 5, 1940.   J. K. DIAMOND   2,220,067
MACHINE FOR APPLYING BELT FASTENERS
Filed Jan. 30, 1939   3 Sheets—Sheet 1
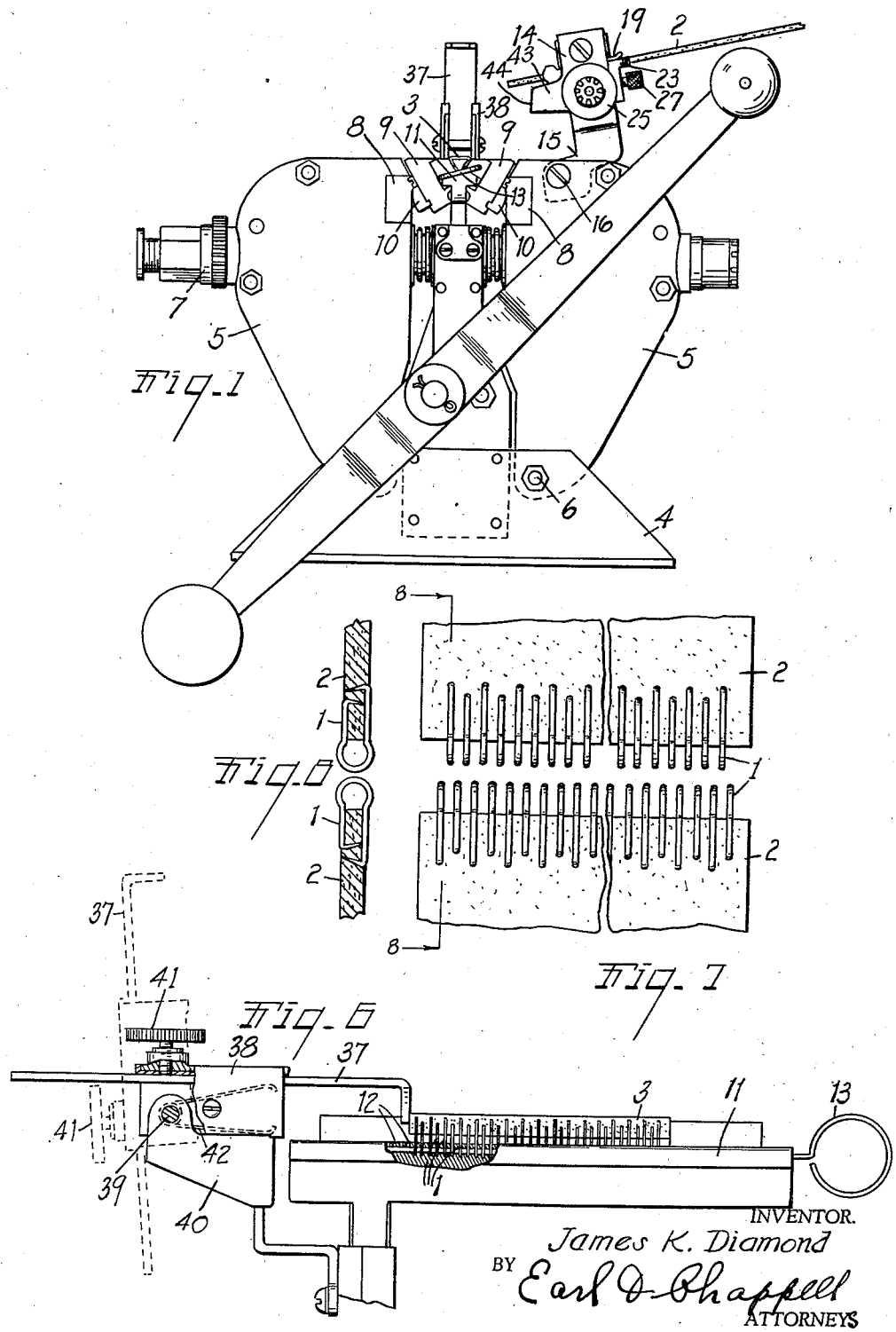
INVENTOR.
James K. Diamond
BY Earl D. Chappell
ATTORNEYS Nov. 5, 1940.  J. K. DIAMOND  2,220,067
MACHINE FOR APPLYING BELT FASTENERS
Filed Jan. 30, 1939  3 Sheets-Sheet 2
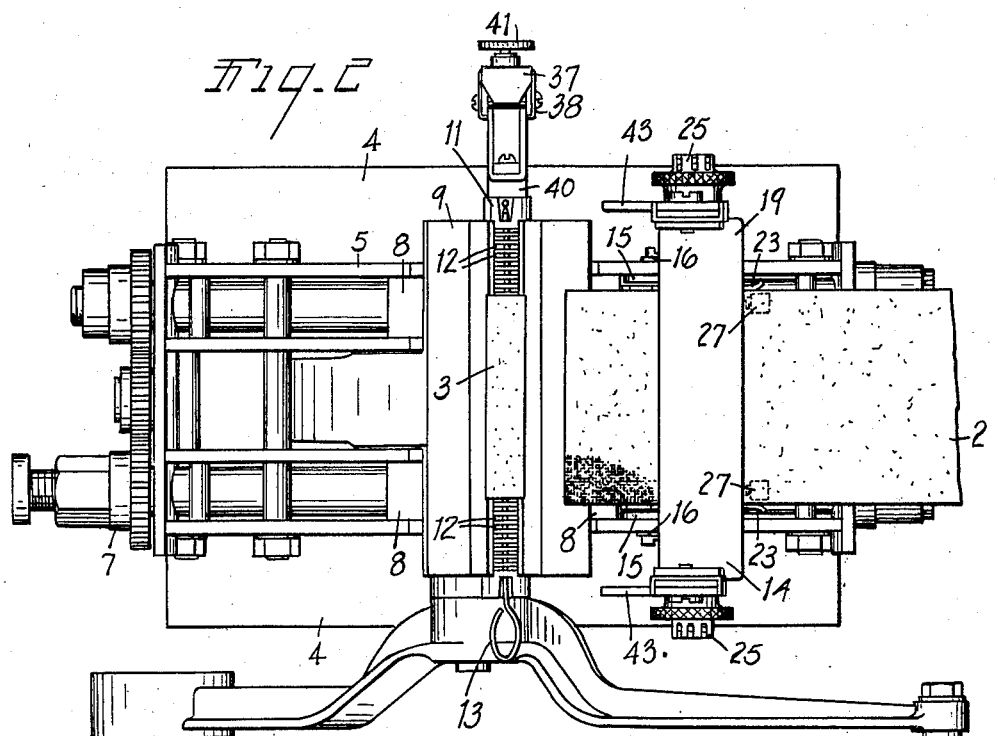
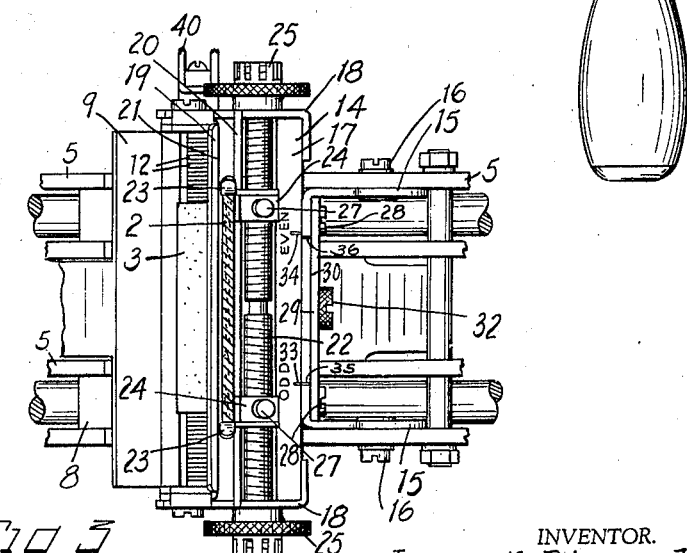
INVENTOR.
James K. Diamond
BY Earl F. Chappell
ATTORNEYS Nov. 5, 1940.  J. K. DIAMOND  2,220,067
MACHINE FOR APPLYING BELT FASTENERS
Filed Jan. 30, 1939  3 Sheets-Sheet 3
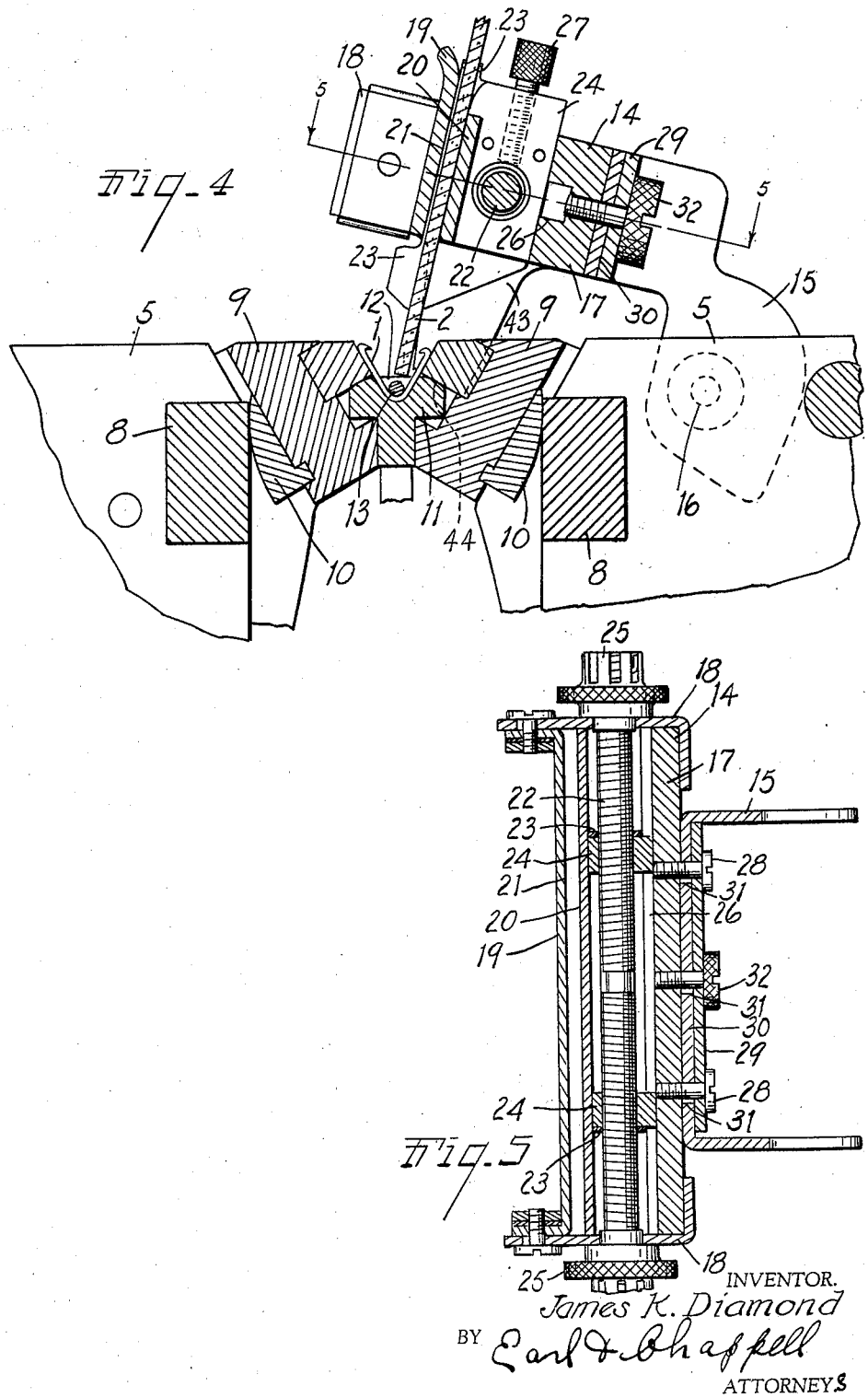
INVENTOR.
James K. Diamond
BY Earl F. Chappell
ATTORNEYS Patented Nov. 5, 1940

2,220,067

UNITED STATES PATENT OFFICE 2,220,067

MACHINE FOR APPLYING BELT FASTENERS

James K. Diamond, Grand Rapids, Mich., assignor to Clipper Belt Lacer Company, Grand Rapids, Mich., a corporation of Michigan Application January 30, 1939, Serial No. 253,491

12 Claims. (Cl. 1—49.4)

This invention relates to improvements in machines for applying belt fasteners.

The main objects of this invention are:

First, to provide a machine for applying belt fasteners by means of which the operation of applying the sets of fasteners in proper relation to each other on opposite ends of a belt is greatly facilitated.

Second, to provide a machine of this character which enables the accurate application of belt fasteners to a series of belts or the like in proper relation to the edges thereof.

Third, to provide in a machine of the class described means for applying sets of belt fasteners to opposite ends of a belt in proper coacting relation and insuring that the edges of the belt at the joint are in alinement.

Fourth, to provide a machine which may be quickly adjusted to accomplish the ends stated with belts of any width within the scope of the machine.

Further objects relating to details and economies of the invention will definitely appear from the description to follow. The invention is defined in the claims.

A machine which embodies the features of my invention is clearly illustrated in the accompanying drawings in which:

Fig. 1 is a side elevation of a machine embodying the features of the invention with the belt positioning member in retracted position but with a section of belt therein.

Fig. 2 is a plan view of the machine of Fig. 1, a series of carded hooks being shown in the holder prior to removing the cards.

Fig. 3 is a fragmentary plan view similar to Fig. 2 with the belt positioning member in another position.

Fig. 4 is an enlarged fragmentary view partially in vertical section with the belt positioning member in its actuated or belt positioning position.

Fig. 5 is a fragmentary view partially in section on line 5—5 of Fig. 4.

Fig. 6 is a fragmentary view showing details of the fastener positioning member, it being shown in its operative relation to a card of fasteners by full lines and in its retracted position by dotted lines.

Fig. 7 is a fragmentary view illustrating opposite ends of belts with the fasteners applied thereto.

Fig. 8 is a fragmentary view in section on line 8—8 of Fig. 7 showing how the fasteners are set into the belt.

My present invention is an improvement upon and in some respects an adaptation of certain features shown in my Letters Patent No. 1,657,616 issued January 31, 1928, and No. 1,689,012 issued October 24, 1928. Therefore, in the accompanying drawings, I have illustrated in detail only such portions as seem necessary to clearly illustrate a practical commercial embodiment of my present invention. It will be readily understood that in the application of belt fasteners to the ends of belts it is desirable to have the belt fasteners, which are designated by the numeral 1 in the accompanying drawings, applied to the ends of the belt, designated by the numeral 2, in proper engaging relation so an even number of fasteners are applied to one end and an odd number to the other. These fasteners are commonly mounted on cards 3, not only to facilitate the merchandising of the fasteners but also to facilitate positioning in desired position and number in the machine by which they are applied. Sometimes the cards are of considerable length and the desired section is cut off for lacing a particular belt.

The machine of my present invention is especially desirable for the application of carded hooks which are sold carrying hooks of the proper number for belts of certain widths, certain of the cards having an even number of hooks and others the odd number. These points are mentioned at this time as it is believed it will assist in understanding the mechanism which will now be described.

In the accompanying drawings the base 4 is of suitable design to support the oppositely positioned jaw supports 5 which are mounted for movement to and from each other as by means of the pivots or bolts 6 and provided with adjusting means designated generally by the numeral 7. This adjusting means is substantially that disclosed in my said patents. The jaw supports carry thrust members 8 for the coacting jaws 9 which are provided with rocker-like members 10 in supporting engagement with these thrust members. Means are provided for simultaneously closing the jaws but such means are not detailed as the present machine embodies substantially the mechanisms shown in my above mentioned patents.

A fastener holder member 11 is operatively associated with the jaws substantially as disclosed in said patents and is provided with a series of transverse fastener receiving slots 12 each adapted to receive a fastener 1. The holder has a longitudinal bore adapted to receive the retaining pin 13 which engages within the bights of the fasteners assembled therein as illustrated. The fasteners are mounted on the cards 3 in spaced relation corresponding to the spacing of the holder so that the entire unit of fasteners is positioned in the holder at one time, the card being removed after the fasteners are positioned and the retaining pin 13 inserted. It will be noted that the prongs of the fasteners engage the flanges of the card from the outside so that the card may be readily stripped from the prongs.

My present improvements contemplate means for positioning the belts relative to the positioned fasteners and also means for positioning the fasteners relative to the belt to which they are to be applied, this being particularly desirable where a plurality of belts of the same width or character are to be laced.

I provide a belt positioning head or member designated generally by the numeral 14 which is swingably supported by the yoke-like member 15 pivoted at 16 on one of the jaw supports so as to be swung to retracted position as shown in Fig. 1 or forwardly to operative or actuated position as shown in Fig. 4. This positioning member comprises a cross bar 17 having end pieces 18 on the ends thereof carrying a pair of spaced cross members 19 and 20 forming a belt receiving slot 21. The shaft or rod 22 is rotatably mounted in the end members 18 and has reversely threaded ends, that is, right hand threads at one end and left hand threads at the other.

Belt guide members 23 are disposed in the slot carried by the slides 24 mounted in the positioning member or head to be simultaneously adjusted to and from each other by the threaded shaft which has finger pieces 25 at each end. A slideway 26 is provided for these slides at one side of the screw, the opposite side of the slides being supported by the cross piece 20, see Fig. 5. The upper ends of these guides are preferably flared outwardly to assist in guiding a belt into position as indicated in Fig. 3. Set screws 27 are provided for securing the guide members in their adjusted positions and preventing accidental turning of the shaft.

As previously stated, in order to secure the most desirable results in a belt lacing employing a plurality of fasteners, it is preferable that one end of the belt shall have an even number of fasteners and the coacting end an odd number. This facilitates proper positioning of the belt ends and also the most desirable pull or draft results.

To rapidly and conveniently adjust the positioning member for placement of the odd and even groups of fasteners, the positioning head is mounted on its support for adjustment laterally thereof. This mounting consists of a pair of supporting screws 28 which are arranged through a tie plate 29 on the inner side of the cross portion 30 of the support 15 and threaded into the cross bar 17. The cross member 30 of the support has slots 31 (see Fig. 5) therein receiving the screws so that the parts can be adjusted when the clamping screw 32 is released. The screws 28 are not clamped tightly but merely serve to hold the parts together for sliding adjustment. The screw 32 is designed to clamp the parts in their adjusted positions. The slots are of such length as to serve as stops limiting the adjustment to one-half the spacing of the fasteners. It will be understood that the fastener holder 11 remains in a relatively fixed lateral relation in the machine although it falls and rises as the fastening jaws are actuated and retracted.

To indicate the position of the head the positioning head 14 is provided with indexing markings 33 and 34 (Fig. 3) designated "Odd" and "Even." The support 15 is provided with coacting indexing indicia or markings 35 and 36. The head of the set or locking screw 32 is preferably knurled and also provided with a tool receiving slot.

To facilitate the positioning of the fasteners in the holder (Figs. 2 and 6) I provide a fastener positioning finger 37 which is slidably mounted in the support 38 pivoted at 39 on a bracket 40 at the end of the fastener holder. The positioning finger is secured in its adjusted position by means of the set screw 41. The spring 42 acts to return the positioning finger to its retracted position.

The belt positioning member is provided with rests 43, see Figs. 1, 2, and 4, which are adapted to rest upon the fastener holder 11 at 44 when the positioning member is in operative position, as illustrated in Fig. 4. It will be observed that when the jaws are closed the fastener holder moves downwardly during the closing movement in the manner of the machine illustrated and described and, inasmuch as the rests are supported on the holder in the two patents referred to, the belt positioning member moves downwardly therewith and maintains the proper relation of the belt to the fastener holder. In fact, in the embodiment illustrated, the rests are slightly cammed to provide a surface having considerable area of contact with the side edge of holder 11, so that the positioning member rests fully on and is fully sustained by the fastener holder during this travel, and this minimizes the possibility of not having the belt firmly against the holder or of having it urged too strongly against the same at the time the hook points start to penetrate the belt.

In the operation of the machine a card containing the desired number of hooks (Fig. 6), either odd or even, is positioned in the holder, preferably centrally thereof, and the positioning finger 37 swung down and adjusted into contacting relation to the end of the card, the purpose being that when a succeeding card is positioned it is only necessary to swing the positioning finger down and arrange the card with its end in abutting relation thereto. After the gauge is positioned the card is stripped, leaving the hooks in the holder, a belt is placed in the belt positioning member 14 and positioned in proper relation to receive the hooks, and the guide members 23 carried by slides 24 are then slidably adjusted into position for contact of the edges of the belt therewith as shown in Fig. 3. The set screws 27 may be adjusted to lock the parts in adjusted position and this is desirable particularly if the lacing operation is to be repeated several times. With the belt in position the machine is actuated to apply the fasteners and the belt removed. The operation may be repeated any number of times without further adjustment.

If a single belt is to be laced, or when the fasteners are to be applied to the other end of the belt, assuming that the positioning head has been adjusted for the odd number of fasteners, as illustrated in Fig. 3, it is then adjusted by loosening set screw 32 and shifting the belt positioning member or head on the yoke-like supporting member 15 therefor so as to bring the indexing marking 36 on the latter in line with the marking 34 on the head. The belt positioning member is thus shifted a distance equal to one-half of the spacing of the fasteners. The length of slots 31 may be relied on to determine this movement. The screw 32 is then tightened. This is the position for application of an even number of fasteners by the means described and the fasteners are accurately positioned when applied.

I have illustrated and described my invention in a very practical embodiment thereof. I have not attempted to illustrate or describe various modifications and adaptations which I contemplate as it is believed this disclosure will enable those skilled in the art to embody or adapt my invention as may be desired.

Having thus described my invention what I claim as new and desire to secure by Letters Patent is:

1. In a machine for applying belt fasteners, the combination of coacting jaws, a fastener holder operatively associated with said jaws and provided with a plurality of spaced transversely disposed fastener receiving slots, a belt positioning member having an aperture to receive a belt, a swingable support therefor, said positioning member being mounted on its said support for limited adjustment laterally thereof and said support and positioning member being provided with operatively associated position indicating indicia, means for securing said positioning member in its adjusted position on its said support, a right and left hand threaded manually rotatable shaft disposed on said positioning member in parallel relation to its said aperture, and belt guide members mounted on the oppositely threaded portions of said shaft.

2. In a machine for applying belt fasteners, the combination of coacting jaws, a fastener holder operatively associated with said jaws and provided with a plurality of spaced transversely disposed fastener receiving slots, a belt positioning member having an aperture to receive a belt, a swingable support therefor, a right and left hand threaded manually rotatable shaft disposed on said positioning member in parallel relation to its said aperture, and belt guide members mounted on the oppositely threaded portions of said shaft.

3. In a machine of the class described, the combination of coacting jaws, a fastener holder operatively associated with the jaws and provided with a plurality of transversely disposed fastener receiving slots, a belt positioning member, a swingable support therefor, said positioning member being provided with rests resting upon the fastener holder at the ends of the jaws when the positioning member is in operative relation thereto, an adjustable edge guide member on said positioning member, and a fastener positioning member pivotally mounted adjacent one end of said fastener holder and provided with a slidably adjustable positioning finger adapted to be swung into position relative to the fastener holder for predetermining the positioning of a plurality of carded fasteners therein, said positioning finger being provided with means for securing it in its adjusted position on its pivoted member.

4. In a machine of the class described, the combination of coacting jaws, a fastener holder operatively associated with the jaws and provided with a plurality of transversely disposed fastener receiving slots, and a fastener positioning member mounted adjacent one end of said fastener holder and provided with a slidably adjustable positioning finger adapted to be shifted into position relative to the fastener holder for predetermining the position of a plurality of carded fasteners therein, said positioning finger being provided with means for securing it in its adjusted position on its pivoted member.

5. In a machine of the class described, the combination of coacting jaws, a fastener holder operatively associated with the jaws and provided with a plurality of transversely disposed fastener receiving slots, a belt positioning member, a swingable support therefor, and an adjustable edge guide member on said positioning member.

6. In a machine of the class described, the combination of coacting jaws, a fastener holder operatively associated with the jaws and provided with a plurality of transversely disposed fastener receiving slots, an adjustably mounted belt positioning member, a support for mounting said member for adjustment longitudinally relative to the fastener holder and said support and positioning member being provided with operatively associated position indicating indicia.

7. In a machine of the class described, the combination of coacting jaws, a fastener holder operatively associated with said jaws and adapted to receive a plurality of belt lacing fasteners, a belt positioning member mounted to be adjusted into belt positioning relation to belt fasteners supported by said fastener holder member, a coacting pair of belt guide members mounted on said positioning member for simultaneous adjustment to and from each other, and a fastener positioning member operatively associated with said fastener holder to be adjusted to and from operative position relative thereto for facilitating the successive positioning of a plurality of sets of the fasteners in the same relative position therein.

8. In a machine of the class described, the combination of coacting jaws, a fastener holder operatively associated with said jaws and adapted to receive a plurality of belt lacing fasteners, a belt positioning member mounted to be adjusted into belt positioning relation to belt fasteners supported by said fastener holder, and a fastener positioning member operatively associated with said fastener holder to be adjusted to and from operative position relative thereto for facilitating the successive positioning of a plurality of sets of the fasteners in the same relative positioning therein.

9. In a machine of the class described, the combination of coacting jaws, a fastener holder operatively associated with said jaws and adapted to receive a plurality of belt lacing fasteners, a belt positioning member mounted to be adjusted into belt positioning relation to belt fasteners supported by said fastener holder member, an adjustable belt guide member on said positioning member, and an adjustable fastener positioning member operatively associated with said fastener holder for facilitating the successive positioning of a plurality of sets of the fasteners in the same relative position therein.

10. In a machine of the class described, the combination of coacting jaws, a fastener holder operatively associated with said jaws and adapted to receive a plurality of belt lacing fasteners, a belt positioning member mounted to be adjusted into belt positioning relation to belt fasteners supported by said fastener holder member, said positioning member being also mounted for adjustment longitudinally of the fastener holder, and a belt guide member adjustably mounted on said positioning member.

11. In a machine of the class described, the combination of coacting jaws, a fastener holder operatively associated with said jaws and adapted to receive a plurality of belt lacing fasteners, a belt positioning member mounted to be adjusted into belt positioning relation to belt fasteners supported by said fastener holder member, and a belt guide member adjustably mounted on said positioning member.

12. In a machine of the class described, the combination of coacting jaws, a fastener holder member operatively associated with said jaws to receive a plurality of belt lacing fasteners, said fastener holder being carried by the jaws and adapted to move downwardly during the closing movement of the jaws, and a belt positioning member mounted to be adjusted into belt positioning relation to the belt fasteners supported by said holder member, said positioning member being provided with rests resting upon the fastener holder member when the positioning member is in operative relation thereto.

JAMES K. DIAMOND.